United States Patent [19]

Grauleau et al.

[11] Patent Number: 5,071,055

[45] Date of Patent: Dec. 10, 1991

[54] TRAVELLING WAVE TUBE WITH A HELIX-TUBE DELAY LINE ATTACHED TO A SLEEVE THROUGH THE USE OF BORON NITRIDE DIELECTRIC SUPPORTS

[75] Inventors: Didier Grauleau, Soisy sous Montmorency; Dominique Henry, Elancourt, both of France

[73] Assignee: Thomson CSF, Puteaux, France

[21] Appl. No.: 824,588

[22] Filed: Dec. 18, 1985

[30] Foreign Application Priority Data

Dec. 18, 1984 [FR] France ............................... 84 19363

[51] Int. Cl.[5] ............................................. B23K 31/02

[52] U.S. Cl. ..................................... 228/122; 315/3.5; 315/39.3

[58] Field of Search .................. 228/122; 315/3.5, 3.6, 315/39.3

[56] References Cited

U.S. PATENT DOCUMENTS 4,153,859 5/1979 Gross .................................. 315/3.6
4,559,474 12/1985 Duret et al. .......................... 315/3.6
4,645,117 2/1987 Knapp et al. ....................... 228/124

FOREIGN PATENT DOCUMENTS 3406051 8/1985 Fed. Rep. of Germany .
2454694 4/1979 France .
2050047 4/1980 United Kingdom .

OTHER PUBLICATIONS

H. J. Sloley et al., High Power, High Frequency Helix TWT's, Conf. Proc. Microwaves, Jun. 24–26, 1986, pp. 360–365.

*Primary Examiner*—Thomas H. Tarcza
*Assistant Examiner*—David Cain
*Attorney, Agent, or Firm*—Cushman, Darby & Cushman

[57] ABSTRACT

This invention pertains to a travelling wave tube with a helix-type delay line attached to a sleeve through the use of boron nitride dielectric supports, which have a layer of insulating material with a secondary emission coefficient greater than 1, such as aluminum or beryllium oxide, for example.

4 Claims, 1 Drawing Sheet

TRAVELLING WAVE TUBE WITH A HELIX-TUBE DELAY LINE ATTACHED TO A SLEEVE THROUGH THE USE OF BORON NITRIDE DIELECTRIC SUPPORTS

BACKGROUND OF THE INVENTION

1. Field of the Invention

This invention pertains to a travelling wave tube with a helix-type delay line attached to a sleeve through the use of boron nitride dielectric supports.

The invention pertains to the area of travelling wave tubes (TOP's), with a helix-type delay line, i.e., for example, a single helix delay line, of the "ring and bar", "ring and helix" type.

However, to simplify the presentation, the delay line will be assimilated with a single helix in the following.

The helix delay line is placed in a cylindrical sleeve, which is generally made of metal, to which it is attached through the use of dielectric supports.

For travelling wave tubes operating at relatively low power levels, the helix and the supports are assembled in the sleeve by clamping. The helix is made, for example, of tungsten, and the supports are made of quartz, aluminum, beryllium oxide, or boron nitride, for example. The sleeve can be made, for example, of copper of inoxidizable steel.

For travelling wave tubes operating at higher power levels, the helix is soldered to the dielectric supports, which are soldered to the sleeve. In this case, the helix, as well as the sleeve, can be made of copper, and the dielectric supports can be made of beryllium oxide, for example.

Generally, three dielectric supports, regularly distributed at 120 degrees apart, are utilized.

This invention proposes to remedy the problems which occur when boron nitride dielectric supports are utilized.

2. Description of the prior art conductivity and its low dielectric constant, which is about 3 for anisotropic boron nitride; this low dielectric constant prevents energy from concentrating in the dielectric supports and improves the impedance of the coupling.

When boron nitride dielectric supports are utilized for TOP's operating under direct current, a significant fraction of the cathode current is intercepted; this fraction can be as much as 50% of the cathode current. In addition, the fraction of the cathode current which is intercepted can vary in high proportions over time.

When boron nitride dielectric supports are utilized for TOP's operating under impulses, one observes a relatively high helix current, which increases during impulses, and which presents the risk of damaging the helix.

To remedy the problems which have existed for many years in the use of boron nitride dielectric supports, the applicant first coated the dielectric supports with a slightly conductive material, such as graphite. This graphite coating accentuated the problems rather than solving them.

SUMMARY OF THE INVENTION

This invention allows the problems related to the utilization of boron nitride dielectric supports to be solved.

This invention pertains to a travelling wave tube with a helix-type delay line, attached to a sleeve through the use of boron nitride dielectric supports, and characterized in that the supports are coated with a layer of insulating material with a secondary emission coefficient which his greater than 1, such as aluminum or beryllium oxide, for example.

According to the applicant, the problems related to the use of boron nitride dielectric supports are solved when these supports are coated with a layer of insulation material with a secondary emission coefficient which is greater than 1, because the problems observed are due to the fact that boron nitride has a secondary emission coefficient which is less than 1, under the conditions in which it is utilized. This secondary emission coefficient which is less than 1 causes the dielectric supports to assume a high negative potential over time. Consequently, the electron beam is defocused, a significant fraction of the cathode current is intercepted. Thus, a helix current which is not constant and which can become highly significant is observed.

BRIEF DESCRIPTION OF THE DRAWING

Other objects, characteristics and results of the invention will emerge from the following description, which is provided on a non-limitative basis, and is illustrated by the attached drawings which represent the following.

DESCRIPTION OF THE PREFERRED EMBODIMENT

In the various diagrams, the same references designate the same elements, but, for reasons of clarity, the details and proportions have not been respected.

Figure 1:
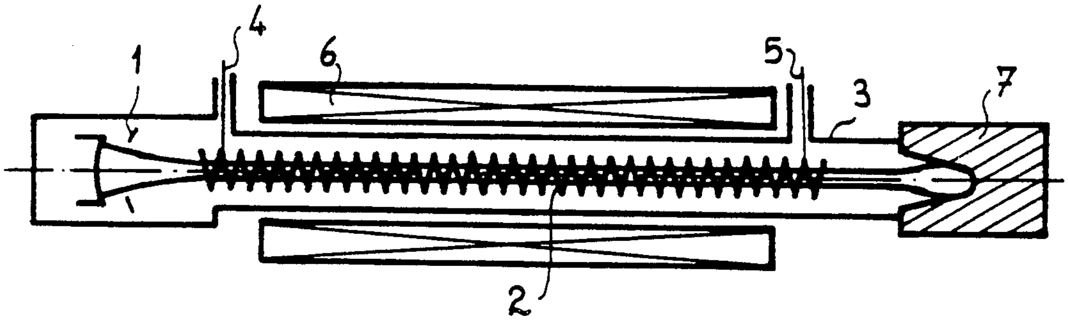
FIG. 1 shows a longitudinal cross-section view of the travelling wave tube with a helix-type delay line.

FIG. 1 shows a longitudinal cross-section view of a travelling wave tube with a helix-type delay line.

Shown, from left to right in FIG. 1, are the electron gun 1, the helix-type delay line 2, which is attached inside a sleeve 3, the tube entry RF 4 and its exit RF5, the beam focusing device 6 and the collector 7.

Figure 2:
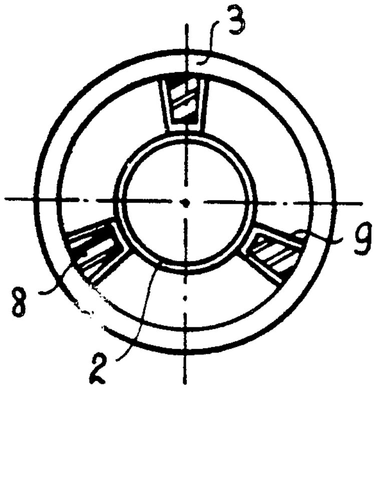
FIG. 2 is a transversal cross-section view showing the boron nitride dielectric supports, which are coated with a layer of insulating material which has a secondary emission coefficient greater than 1.

FIG. 2 is a transversal cross-section view, which shows three dielectric supports 8, placed 120 degrees apart, and which ensure the attachment of the helix-type delay line 2 to the cylindrical sleeve 3.

These supports can be of various sections: rectangular, square... or, as shown in FIG. 2, of relatively trapezoidal shape.

In accordance with the invention, the dielectric supports 3 are coated with an insulating material 9 which has a secondary emission coefficient greater than 1, such as aluminum or beryllium oxide, for example.

The coating is deposited, for example, by cathodic sputtering, at a thickness of 1000 Angstroms, for example.

In the embodiment in FIG. 2, it is noted that three of the four surfaces of the dielectric supports are covered with the layer of insulating material 9. This facilitates the depositing of the layer of insulating material on the supports without hindering the efficiency of the invention. In fact, it is not necessary for the part of the transversal section which is in contact with the sleeve to be coated with the insulating material 9.

What is claimed is:

1. A Travelling wave tube assembly, comprising:

a sleeve;

a helix-type delay line;

a plurality of dielectric supports for attaching the helix-type delay line to the sleeve, each said support having an internal portion made of boron nitride covered by a layer of insulating material different than boron nitride with a secondary emission coefficient greater than 1.

2. Travelling wave tube according to claim 1, wherein said insulating material is aluminum or beryllium oxide.

3. Travelling wave tube according to one of claims 1, or 2, wherein one surface of each said support is in contact with the sleeve, said one surface not being covered with the layer of insulating material.

4. Travelling wave tube according to claim 3 wherein each said dielectric support has four discrete surfaces, including said one surface, said one surface being substantially a similar shape to a shape of an inside of said sleeve.

* * * * *